United States Patent [19]

Bauer et al.

[11] 4,448,091

[45] May 15, 1984

[54] SINGLE-SPOKE STEERING WHEEL

[75] Inventors: Wolfgang Bauer, Karlstein; Werner Grosser, Sulzbach, both of Fed. Rep. of Germany

[73] Assignee: Karl Schmidt GmbH, Neckarsulm, Fed. Rep. of Germany

[21] Appl. No.: 209,802

[22] Filed: Nov. 24, 1980

[30] Foreign Application Priority Data

Nov. 23, 1979 [DE] Fed. Rep. of Germany ....... 2947197

[51] Int. Cl.³ .............................................. B62D 1/04
[52] U.S. Cl. ..................................... 74/552; 29/159 B
[58] Field of Search ......................... 74/552; 29/159 B

[56] References Cited

U.S. PATENT DOCUMENTS

| 1,411,239 | 3/1922 | Dover | 74/552 |
| 2,041,739 | 5/1936 | Beck | 74/552 |
| 4,011,643 | 3/1977 | Muller et al. | 74/552 |
| 4,047,450 | 9/1977 | Lecart et al. | 74/552 |

FOREIGN PATENT DOCUMENTS

| 1023104 | 3/1953 | France | 74/552 |
| 1151080 | 1/1958 | France | 74/552 |

Primary Examiner—Kenneth Dorner
Attorney, Agent, or Firm—Sprung, Horn, Kramer & Woods

[57] ABSTRACT

In a steering wheel covered with a layer of plastic material, the steering wheel hub is connected to the steering wheel rim by a steering wheel spoke. To reduce the manufacture expenditure, the spoke is embedded in the steering wheel hub consisting of an aluminum pressure diecasting and the spoke as well as the portion of the steering wheel rim to which the spoke is connected are embedded by a pressure-diecast layer.

4 Claims, 8 Drawing Figures

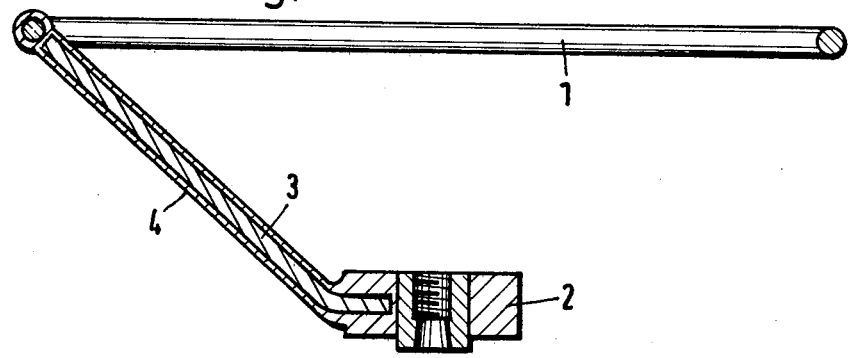
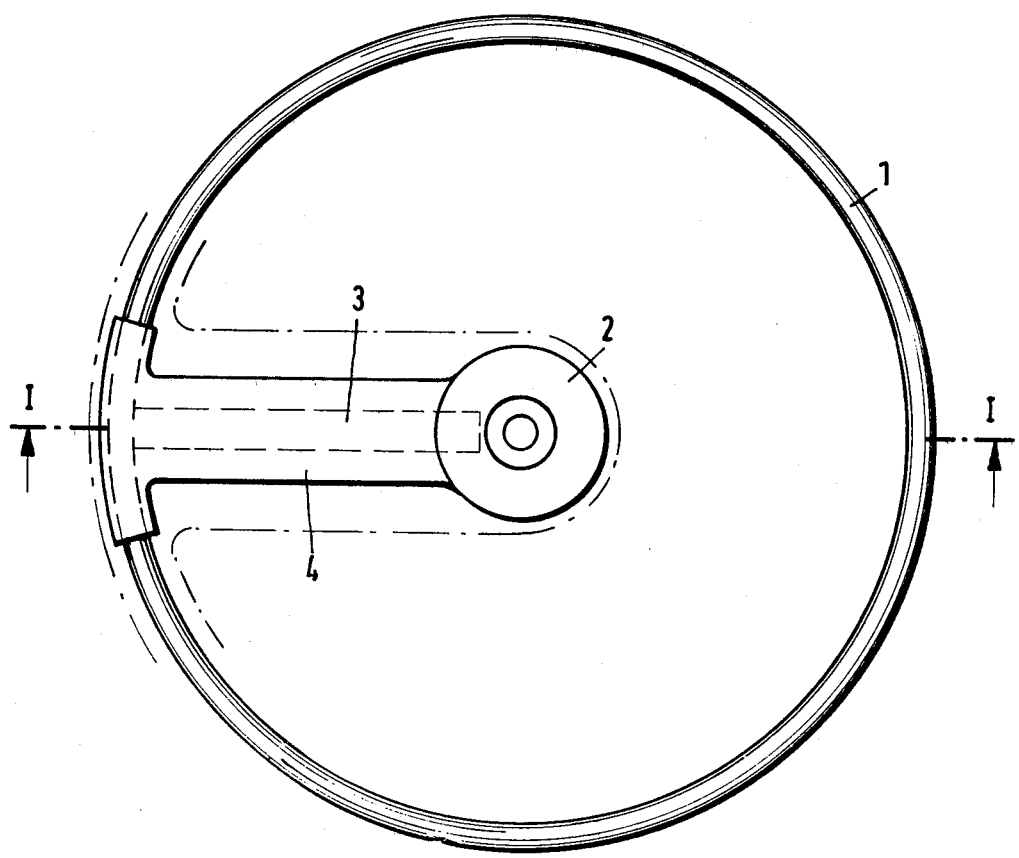

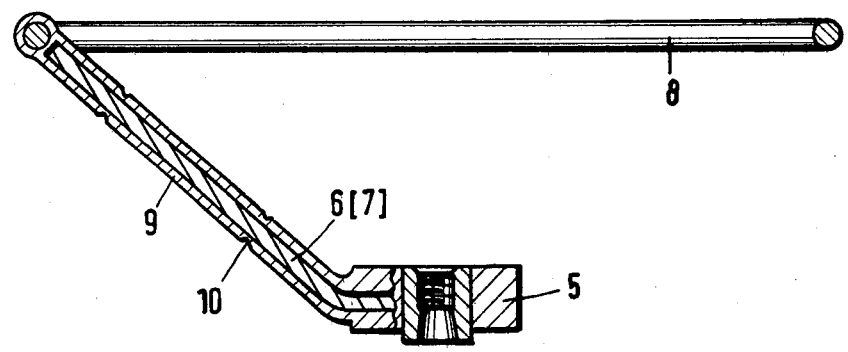
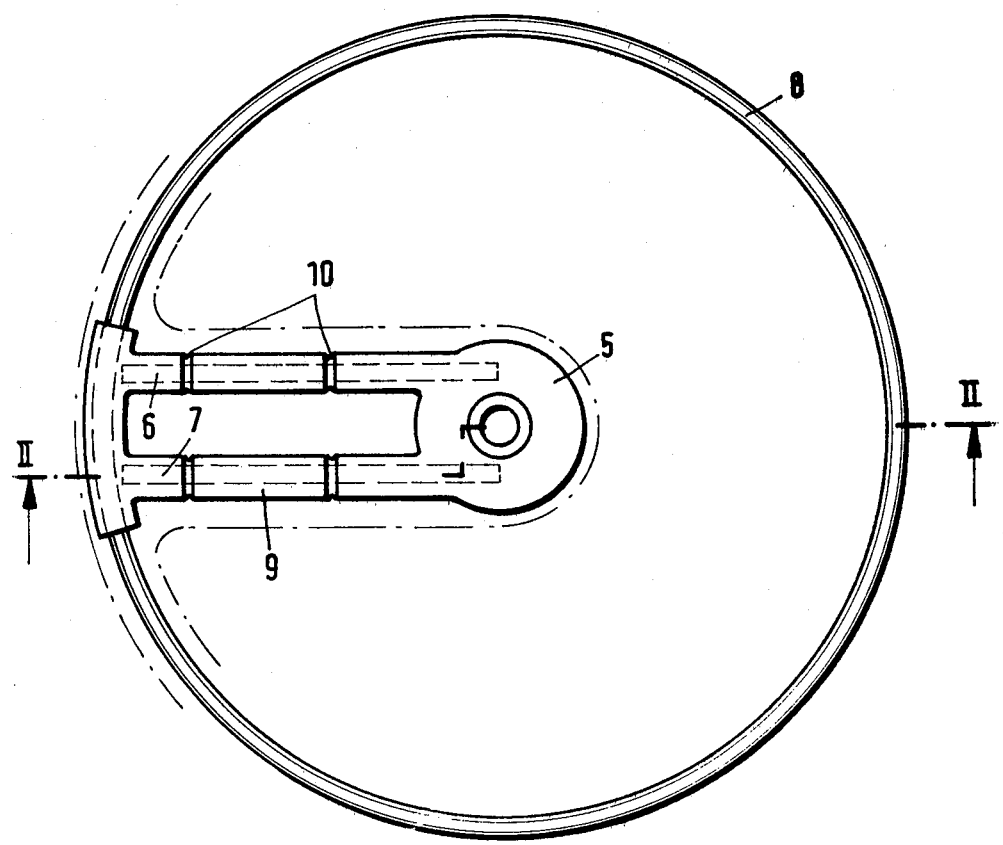

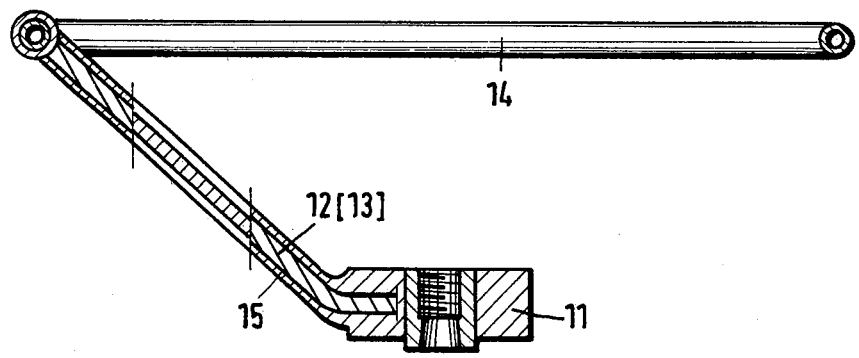
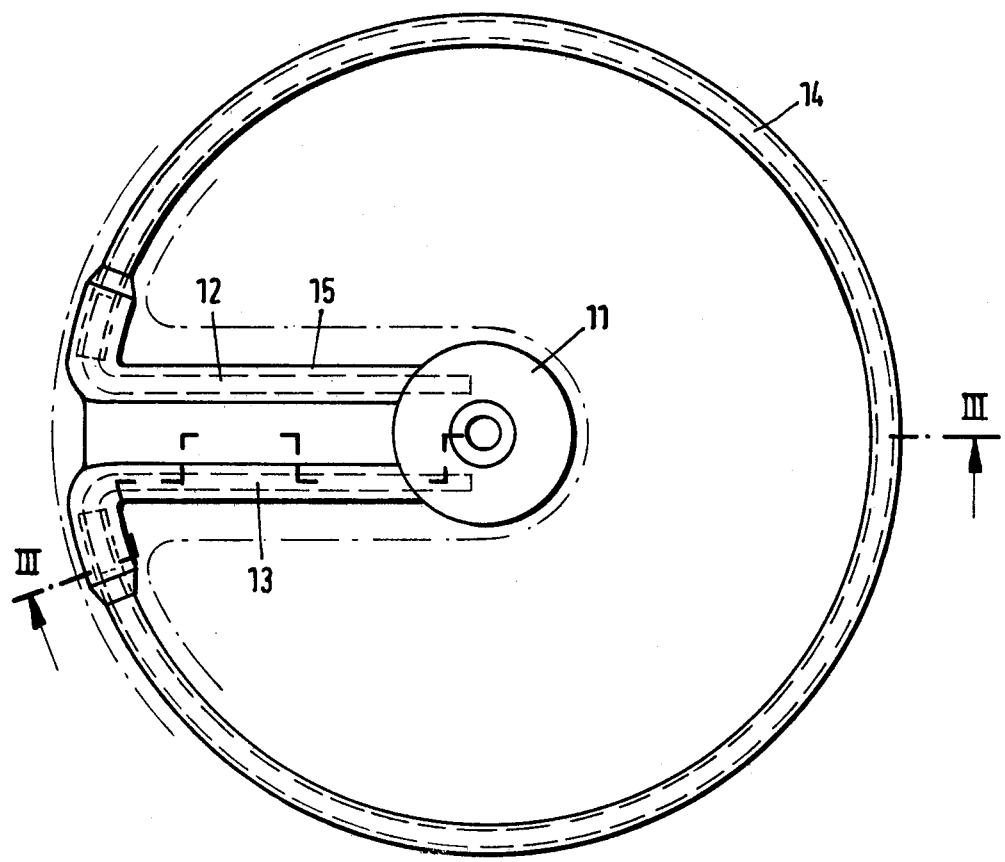

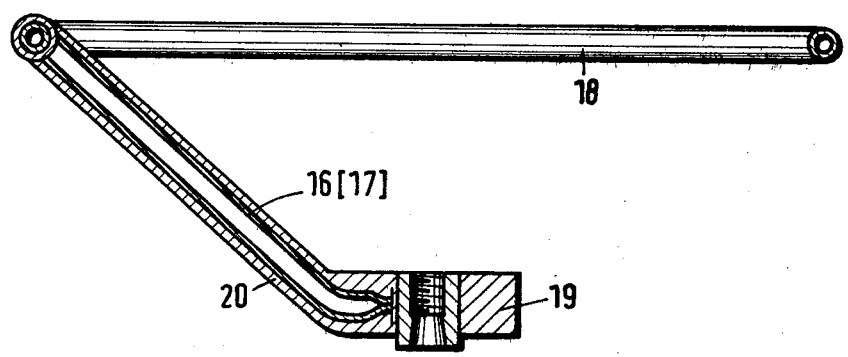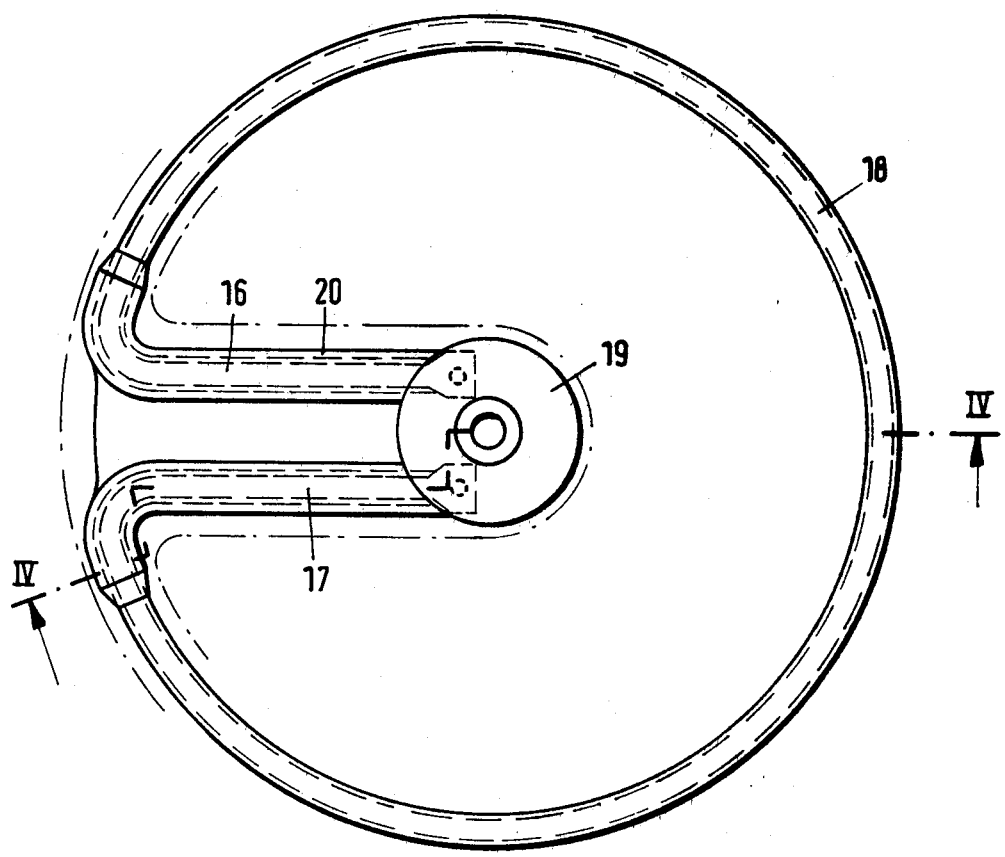

SINGLE-SPOKE STEERING WHEEL

BACKGROUND OF THE INVENTION

This invention relates to a steering wheel, which comprises a steering wheel hub, a steering wheel spoke, which is joined to the steering wheel hub and extends in the vertical center plane of the steering wheel, and a steering wheel rim, which is joined to the steering wheel spoke and consists preferably of a metal tube, which parts are covered by a layer of plastic material.

Single-spoke steering wheels have a particularly attractive appearance and afford the advantage that they do not obstruct the view to the indicating instruments disposed on the dashboard in the direction of view of the driver.

In known single-spoke steering wheels, one end of the steering wheel hub protrudes above the upper bearing for the steering column and in the vertical center plane of the steering wheel is bent down and is joined to the steering wheel rim with formation of the spoke. The steering wheel has the disadvantage that it is most difficult to install the signalling device and to attach energy-absorbing elements for protection in case of an impact.

Other single-spoke steering wheels comprise a hub consisting of a steel disc, to which the spoke consisting of steel wire or steel tubing has been welded. The spoke is also welded to the steering wheel rim. The welding operations do not permit an economical manufacture of steering wheels and involve a substantial expenditure.

SUMMARY OF THE INVENTION

It is an object of the present invention to provide a single-spoke steering which overcomes the disadvantages of the prior art and affects an attractive appearance.

This object is accomplished by the provision of a steering wheel in which, in accordance with the invention, the spoke is embedded in the steering wheel hub, which consists of an aluminum diecasting, and a pressure-diecast layer surrounds the spoke and that portion of the steering wheel rim to which the spoke is connected.

The spoke may consist of two wires, strips, tubes or the like, and those ends of these elements which are bent toward the steering wheel rim are preferably secured in the ends of the steering wheel rim, which is interrupted adjacent to the vertical center plane.

In a modification of the steering wheel designed according to the invention, the steering wheel rim is interrupted in the vertical center plane and its ends are bent inwardly so as to form the steering wheel spoke and are embedded in the pressure diecast steering wheel hub. Both wires, strips, tubes or the like may preferably be interconnected by a pressure diecast web.

Adjacent to the spoke elements, the pressure-diecast layer may be formed with indentations, which form rated breaking points, so that in case of an impact or collision of the vehicle the steering wheel can take up the forces exerted thereon by the driver.

The wires, strips, tubes or the like which form the spoke are parallel to each other or form a V-shaped array.

The single-spoke steering wheel according to the invention is described and explained in detail and is shown by way of example in the accompanying drawings wherein:

BRIEF DESCRIPTION OF THE DRAWINGS

FIG. 1 is a top view of a steering wheel according to the invention;

FIG. 2 is a cross-sectional view of the steering wheel along line I—I in FIG. 1;

FIG. 3 is a top view of a steering wheel;

FIG. 4 is a cross-sectional view along line II—II of FIG. 3;

FIG. 5 is a top view of another embodiment;

FIG. 6 is a cross-sectional view along line III—III of FIG. 5;

FIG. 7 is a top view of another embodiment;

FIG. 8 is a cross-sectional view along line IV—IV of FIG. 7; and

DETAILED DESCRIPTION OF THE INVENTION

A steering wheel is shown in a top plan view in FIG. 1 and in FIG. 2 is shown in a longitudinal sectional view taken along line I—I. This steering wheel comprises a pressure-diecast steering wheel hub 2, which is disposed below the steering wheel rim 1, which consists of steel wire. The steering wheel also comprises a steel wire 3 as well as that portion of the steering wheel rim 1 to which the steel wire 3 is joined is surrounded by a pressure-diecast layer 4. The steel wire 3 is welded to the steering wheel rim.

FIG. 3 is a top plan view showing a steering wheel, which is shown in FIG. 4 in a sectional view taken on line II—II. The steering wheel spoke as shown in FIG. 3 consists of two parallel steel wires 6, 7, which are embedded in the pressure-diecast steering wheel hub 5, and which just as that portion of the steering wheel rim 8 to which they are joined are surrounded by a pressure-diecast layer 9 having indentations 10.

FIG. 5 is a top plan view and FIG. 6 is a sectional view taken on line III—III in FIG. 5. As shown in FIG. 5, the steel wires 12, 13 are embedded in the pressure-diecast steering wheel hub 11 and at their ends disposed near the steering wheel rim 14 are bent toward and secured in the steering wheel rim 14. The steel wires 12, 13 and that portion of the steering wheel rim 14 to which they are joined are surrounded by a pressure-diecast layer 15.

FIG. 7 is a top plan view showing a steering wheel and FIG. 8 is a sectional view taken on line IV—IV in FIG. 8. The steering wheel rim tube 18 is interrupted in the vertical center plane and its ends 16, 17 are bent inwardly so that they extend parallel to form a spoke and are embedded in the pressure-diecast steering wheel hub 19 and surrounded by a pressure-diecast layer 20.

What is claimed is:

1. In a steering wheel having a steering heel hub, a single steering wheel spoke joined to the steering wheel hub and extending in a vertical center plane of the steering wheel, and a steering wheel rim joined to the steering wheel spoke, the improvement wherein: the hub comprises an aluminum pressure diecasting, one end of the spoke is embedded in the steering wheel hub and a pressure-diecast layer surrounds the spoke and a portion of the steering wheel rim to which the spoke is connected, wherein the pressure-diecast layer has circumferential indentations therealong forming breaking points.

2. The steering wheel according to claim 1, wherein the spoke comprises two elongated spoke elements.

3. The steering wheel according to claim 2, further comprising a pressure-diecast web interconnecting the two elongated spoke elements.

4. The steering wheel according to claim 2, wherein the two elongated spoke elements are parallel.

* * * * *